United States Patent [19]

Daie

[11] Patent Number: 4,731,826
[45] Date of Patent: Mar. 15, 1988

[54] MIXED MODE DIALING SYSTEM

[75] Inventor: Hedayat Daie, Cary, N.C.

[73] Assignee: U.S. Holding Company, Inc., New York, N.Y.

[21] Appl. No.: 791,262

[22] Filed: Oct. 25, 1985

[51] Int. Cl.⁴ .............................................. H04M 1/26
[52] U.S. Cl. ..................................... 379/359; 379/355
[58] Field of Search .............. 179/84 VF, 99 R, 99 A, 179/99 LC, 18 AD, 90 B, 90 BB, 90 BD, 81 R; 379/355, 356, 359, 156, 216, 361

[56] References Cited

U.S. PATENT DOCUMENTS

| | | | |
|---|---|---|---|
| 4,119,810 | 10/1978 | Marin et al. | 379/359 X |
| 4,232,200 | 11/1980 | Hestad et al. | 379/188 |
| 4,233,475 | 11/1980 | Roche | 379/361 |
| 4,485,274 | 11/1984 | Jordan et al. | 379/165 |

OTHER PUBLICATIONS

Northern Telecom Inc., marketing bulletin N-1020, 1981, 17 pages.
Northern Telecom Inc. publication, "A Big Break for Small Businesses," 1980, 7 pages.

*Primary Examiner*—James L. Dwyer
*Attorney, Agent, or Firm*—Spencer & Frank

[57] ABSTRACT

To allow PBX or key telephone systems, which are connected to dial pulse central offices, to use discount rate long distance, remote banking, and other services that require DTMF dialing, the system CO interfaces are equipped with a DTMF generator for tone dialing and a loop control relay for pulse dialing, which are under the system control. The user initiates dialing which is in pulse mode by default. After completing the dialing sequence into the CO, by pressing a designated button all other numbers dialed will be in DTMF. After the user hangs up the process may be repeated again. This feature can also be provided in conjunction with auto dialing.

7 Claims, 3 Drawing Figures

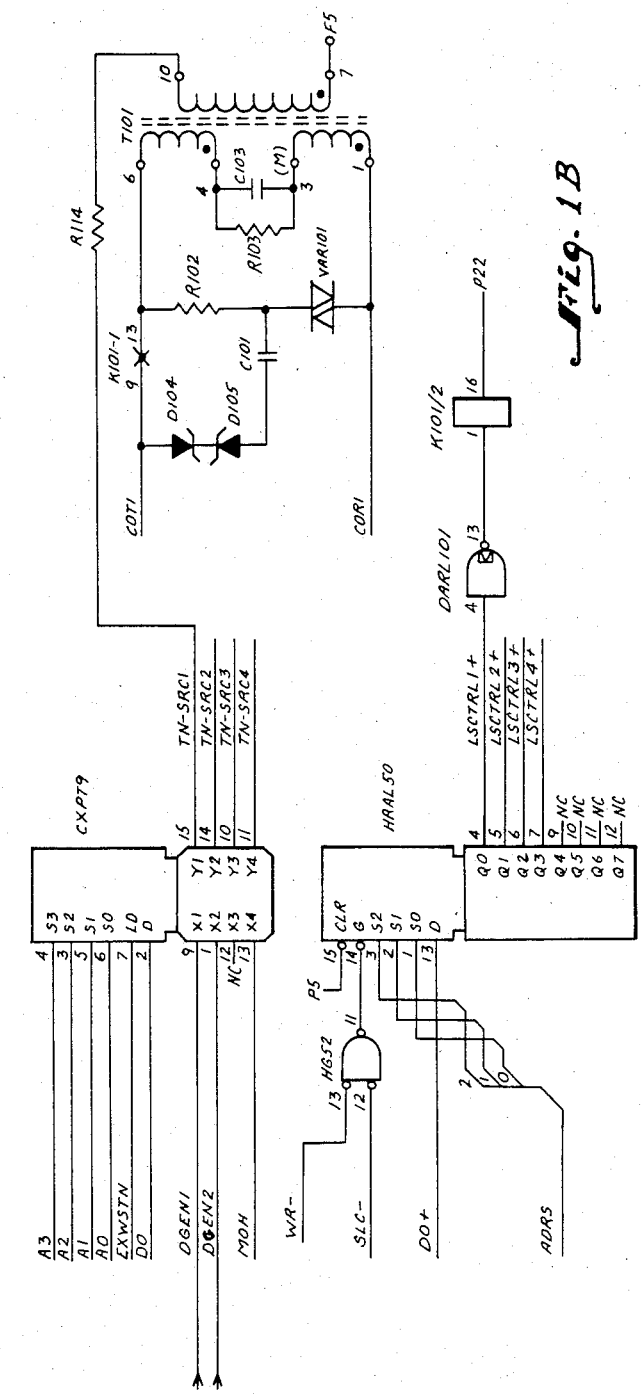

MIXED MODE DIALING SYSTEM

BACKGROUND OF THE INVENTION

The invention relates to the provision of mixed mode dialing for a communication system.

SUMMARY OF THE INVENTION

To allow private branch exchange (PBX) or key telephone systems, which are connected to dial pulse central offices (COs), to use discount rate long distance, remote banking, and other services that require dual-tone multifrequency (DTMF) dialing, the system CO interfaces are equipped with a DTMF generator for tone dialing and a loop control relay for pulse dialing which are under the system control. The user initiates dialing which is in pulse mode by default. After completing the dialing sequence into the CO, a designated button is pressed, resulting in all other numbers being dialed in DTMF. After the user hangs up, the process may be repeated again. This feature can also be provided in conjunction with auto dialing.

This feature is provided while the system complexity is reduced. Since the telephone sets do not contain any signaling circuits, only one type of telephone is required to dial both in pulse and in DTMF. This eliminates the need to design and distribute two types of phones. Also a few shared DTMF generators are used at the CO interfaces instead of one per telephone, and pulse dialing is accomplished by components that already exist in the system, which result in a considerable cost saving.

BRIEF DESCRIPTION OF THE DRAWINGS

Principles of the invention may be better understood from a reading of the following description in conjunction with the drawings in which:

FIGS. 1A and 1B show a partial schematic diagram of a key telephone system incorporating the invention.

FIG. 2 illustrates the relation between FIGS. 1A and 1B.

DESCRIPTION OF THE PREFERRED EMBODIMENT

Figure 1A:
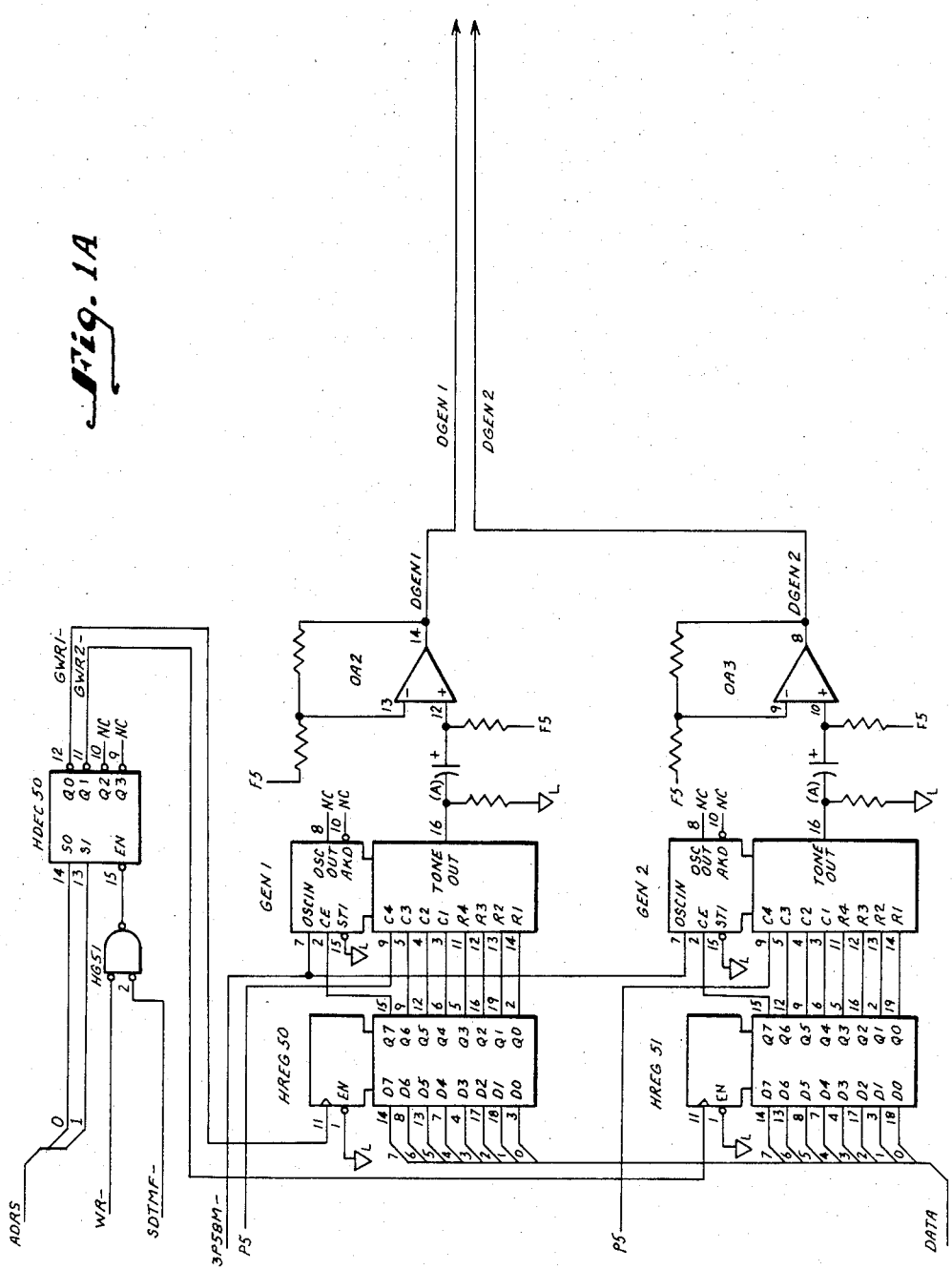

In some situations, the user may need to dial numbers that are part pulse and part tone. For example, this may be required if the local telephone company's central office can accept only pulse dialing, and the user wants to dial through the local central office into another system that can accept tone dialing. The invention accomplishes this mixed mode dialing, that is, from pulse dialing to tone dialing, by pressing the "*" pushbutton. For example, the user can dial the first group of digits using pulse dialing. At the point where the user wants the type of dialing to change, the user presses the "*" pushbutton. Then, the user can dial the second group of digits using tone dialing. The user can use this dialing mode change method while making a call. If the system is equipped with a speed dialing option, the user can use this dialing mode change method while storing digits in a memory location for speed dialing.

A station user can change the type of dial signaling from pulse to tone, while dialing a number, by pressing the "*" button on the pushbutton dial keypad. When the change is made, the remaining digits in the number will be transmitted as tone signaling until the telephone goes on-hook.

The telephone in a key system embodying the invention is, for example, as disclosed in pending U.S. patent application Ser. No. 687,626, filed Dec. 31, 1984, of H. Daie, and in the copending U.S. patent application of H. Daie et al., filed concurrently herewith, entitled "Call Progress Tone System", both of which are incorporated herein by reference. Such a telephone does not have any signaling circuits such as dual-tone multifrequency (DTMF) or pulse dialers. In such a system, the central office (CO) interface contains only a DTMF circuit. Each CO line can then dial in DTMF of pulse via the loop relay under microprocessor control. A number of economical advantages are provided. Since there are fewer CO interfaces than telephones, the number of DTMF generators in the system is reduced, in the case of the exemplary system, by ten integrated circuits. The same telephone can be used to dial into pulse or DTMF CO lines, thus eliminating the need to design, manufacture, and distribute two types of phones. Also, a significant advantage, called mixed mode dialing, is provided because both pulse and DTMF dialing are under system control and can be mixed if necessary. In the cases where the CO is pulse, but the user wants to use long distance carriers, such as ITT, MCI, or Sprint which require DTMF signals, the user starts dialing in pulse, which is programmed as the system default, and then, when the DTMF long distance carrier (DLDC) answers, he can dial "*". "*" is not generated in pulse, rather, it prompts the system to start dialing in DTMF and then any number from that point on is in DTMF until the end of the call. The next call again begins in pulse. This scheme works well with auto dialing where "*" can be stored in the middle where the conversion must occur. The dialed number is partitioned, for example, as follows:

| 9 | P | 7L | P | * | 7C | 10D |
|---|---|----|---|---|-----|-----|
| If Behind PBX | Pause For Tone | Local DLDC No. | Pause For Dial | Convert To DTMF | DLDC Access Code | Destination |

After conversion to DTMF, "*" is transmitted as "*" in DTMF, which may have use in remote banking or other services.

A good way to partition the auto dialing task is:

| 9 P 7L P * 7C | 10D |
|---|---|
| As a system speed dialing number so that all users can have access to it. | Station Number (personal) |

Thus system cell lengths can be optimized by having 18 digit lengths and station speed dialing at 14 digits. Note all numbers must be in the system data base which also provides the advantage of not requiring the provision of batteries in the telephone subsets.

When a station is dialing on a CO line, the dialed digits are outpulsed by the system either as DTMF tones or as dial pulses depending on how the system is programmed, and these tones and pulses are audible to the user. Outpulsed tones or pulses are generated in accordance with E.I.A. Section 478 requirements. If a "*" is dialed and the current outpulsing mode is dial pulse, then the mode is switched in stream to DTMF (this "*" digit is not outpulsed). In dial pulse mode a "#" digit is ignored. In DTMF mode the "*" and "#" digits simply send the associated DTMF tones. When dialing the user does not hear the system generated tone or pulse but rather hears a subset generated confidence tone.

When auto dialing is requested, the digits outpulsed by the system (called the digit string) will be sent either as DTMF tones or as dial pulses depending on how the system is configured and these tones and pulses are audible to the user. Also, consistent with normal CO dialing, if a "*" digit is encountered in the digit string and the current outpulsing mode is dial pulse, then the mode will be switched to DTMF (this "*" is not outpulsed). In DTMF mode the "*" digits will simply send the associated DTMF tone. A "#" encountered in the digit string is the pause digit and is described below.

Mixed mode dialing is effective in conjunction with auto dialing features, for use when making outside line calls, such as system speed dialing, station speed dialing, and last number redialing. In an exemplary system, all three dialing features use the AUTO DIAL button on the telephone, the keypad "#" button for "stop" or redialing, and the keypad "*" button to change from dial pulse to DTMF (tone) signaling.

In the exemplary system, the memory capacity for system speed dialing is 20 numbers, each containing a maximum of 18 digits. A three-digit locator ("010" through "029") is assigned to each number as it is stored, and then is used to retrieve the number for automatic dialing. Two locators can be used for numbers longer than 18 digits. Mixed mode dialing and "stops" can be stored as part of the number and activated during dialing. However, mixed mode dialing is effective only if the system is programmed for dial pulse signaling. All numbers are stored for system speed dialing as a system programming function. They are available for automatic dialing at any station in the system.

Also in the exemplary system, up to 9 numbers containing 14 digits each can be stored at each station for automatic dialing by the storing station, or station speed dialing. A one-digit locator ("1" through "9") is assigned to each number as it is stored, and then is used to retrieve the number for automatic dialing. Two locators can be used for numbers longer than 14 digits. Mixed mode dialing and "stops" can be stored as part of the number, and can be activated during dialing. However, mixed mode dialing is effective only if the system is programmed for dial pulse signaling.

Additionally in the exemplary system, a number dialed with an outside line selected is stored as the last number dialed, for last number redialing. This number can contain up to 18 digits and mixed mode dialing, but it cannot contain a "stop". (If the number contains more than 18 digits, only the last 18 digits dialed will be stored.) The number is stored by the station when the selected outside line is released by going on-hook. When an outside line is selected again, the stored number can be automatically dialed again.

Since the key system performs the DTMF of the pulse dialing of the CO trunks, only one type of subset is required for the exemplary system, one that can be used with either pulse or DTMF CO lines. Consequently, the need to design, manufacture, and distribute different model phones is eliminated.

Field programmable signaling is provided. The key system can be programmed to dial the CO by DTMF or pulse. It also provides an automated method of dialing the CO in pulse and then converting to DTMF when dialing the long distance carriers. There is no need for any pulse dialing circuitry in the system, since the loop control relays can pulse dial under microprocessor control.

An exemplary key telephone system employing the invention is shown in part in FIGS. 1A and 1B and is sold commercially as the ITT ARIES EKS-401 by ITT Corporation. The Key System Unit (KSU) contains both pulse and DTMF dialing circuits, while the subsets signal the KSU via a digital link for dialing purposes. Mixed mode dialing is accomplished by dialing a "*". While in pulse mode dialing a "*" will command the KSU to switch to DTMF mode.

The per line circuitry of the CO line interface contains a line transformer T101 to match the 600 ohm CO line to the 2400 ohm system. Line seizure and dial pulsing are performed by relay K101, under control of a system central processing unit (CPU), software driven. An octal addressable latch HRAL50 and AND gate HG52 are used to control the relay. Relay driver DARL101 is used to drive the relay using a TTL signal. Transients due to out-pulsing as well as harmful line conditions are suppressed by the transient suppression circuit formed by D104, D105, C101, R102, and VAR101. Signals COT1 and COR1 represent the CO line number one tip and ring. Components R103 and C103 are standard CO line interfacing components.

The DTMF generators place DTMF signals on the CO line under CPU control, software driven, when an outside call is made from a subset. Each generator provides DTMF tones for two CO lines. Contention between subsets for generator use will rarely happen, but keypad closures are buffered by the CPU as they occur to be fed to the generator when it is available. Decoder HDEC50 and one AND gate HG51 are used to select the correct generator at the proper time. Buffered address lines A0 and A1 and Write Enable WR- from the CPU, as well as generator select line SDTMF- from the address decode circuit are used to determine when a tone is to be generated, and which generator to be used. The selected octal flip-flop HREG50 or HREG51 then latch the data from the CPU at the trailing edge of generator write signal GWR1- or GWR2-, respectively. The outputs of both flip-flops are continuously enabled by grounding their enable pins. The high bit of each latched data byte is used to enable its respective generator chip, GEN1 or GEN2. The reference clock signal for the generators 3P58M- is the 3.58 MHZ CPU clock.

Each generator output is amplified by a simple op amp circuit (OA2 and OA3) with a voltage gain of 2.5. The output of each generator is connected directly to a respective resistor for direct current (DC) loading, and to a capacitor for DC blocking. Each amplitude is biased by the "floating five volt" signal (F5). This is the bias voltage for all voice-related circuitry. The DTMF signals are then routed to the crosspoint matrix CXPT9, and under CPU control the proper DTMF signal is routed to a CO line.

For simplicity, muting and/or disconnecting of dial pulse and DTMF tone signals from the subset voice link are carried out in other areas of the system instead of the CO interface circuitry. DTMF generators C4 signals are not used and are terminated accordingly.

The invention can be implemented using various circuit configurations, and has broad application in customer premise switching systems. It can be used in any analog or digital key telephone system or PBX that interface to the central office through a two wire analog interface. It can also be used for systems employing communication sets, such as personal computer and data terminals, whether or not in combination with telephone sets.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

I claim:

1. A communication system, comprising:
   means for generating tone dialing signals,
   means for generating pulse dialing signals, and
   means, coupled to both of said generating means, to switch from said pulse means to said tone means, while transmitting said signals in stream, wherein said switching means comprises:
     means for detecting a dial-mode switch over prompting signal; and
     means, coupled to said detecting means, for transmitting said tone dialing signals in response to said detection, further comprising:
     means, coupled to said detecting means, for providing said dial-mode switchover prompting signal, and
     memory means, coupled to said prompting signal providing means, for storing said prompting signal together with signals representative of an auto dial number.

2. A communication system, according to claim 1, wherein said pulse signal generating means comprises:
   a loop relay, for interrupting a loop signal, and;
   control means, coupled to said loop relay, for controlling said interrupting of said loop signal so as to provide a pulse dialing signal.

3. A communication system, according to claim 1, wherein said tone signal generating means comprises:
   a dual-tone multifrequency signal generator and control means, coupled to said generator, for controlling said generator to provide a tone dialing signal.

4. A communication system, according to claim 1, wherein said prompting signal providing means comprises:
   a key button; and
   a digital signalling means, coupled to said key button, for providing said prompting signal to said detecting means in response to depression of said key button.

5. A private branch exchange system, comprising:
   a plurality of communication subsets, and
   a central telephone switching means for coupling said subsets to a central office, wherein said telephone switching means comprises:
     means for generating tone dialing signals,
     means for generating pulse dialing signals, and
     means, coupled to both of said generating means, to switch from said pulse means to said tone means, while transmitting said signals in stream, wherein said switching means comprises:
     means for detecting a dial-mode switch over prompting signal; and
     means, coupled to said detecting means, for transmitting said tone dialing signals in response to said detection, further comprising:
     means, coupled to said detecting means, for providing said dial-mode switchover prompting signal, and
     memory means, coupled to said prompting signal providing means, for storing said prompting signal together with signals representative of an auto dial number.

6. A key telephone system, comprising:
   a plurality of telephones, and
   a central telephone switching means for coupling said telephones to a central office, wherein said telephone switching means comprises:
     means for generating tone dialing signals,
     means for generating pulse dialing signals, and
     means, coupled to both of said generating means, to switch from said pulse means to said tone means, while transmitting said signals in stream, wherein said switching means comprises:
     means for detecting a dial-mode switch over prompting signal; and
     means, coupled to said detecting means, for transmitting said tone dialing signals in response to said detection, further comprising:
     means, coupled to said detecting means, for providing said dial-mode switchover prompting signal, and
     memory means, coupled to said prompting signal providing means, for storing said prompting signal together with signals representative of an auto dial number.

7. A communication system, comprising:
   memory means for storing and reading out a sequence of character signals representative of an auto dial number and a switchover prompting signal;
   tone generating means for generating tone dialing signals corresponding to character signals;
   pulse generating means for generating pulse dialing signals corresponding to character signals; and
   means, coupled to both of said generating means and responsive to character signals read out of said memory means, for detecting said switchover prompting signal and thereupon switching from said pulse generating means to said tone generating means while transmitting dialing signals in a stream, wherein said stream of dialing signals does not include a dialing signal corresponding to said switchover prompting signal.

* * * * *